United States Patent
Vazhenin et al.

(10) Patent No.: US 9,965,215 B1
(45) Date of Patent: May 8, 2018

(54) DISK SYNCHRONIZING

(71) Applicant: EMC Corporation, Hopkinton, MA (US)

(72) Inventors: Maksim Vazhenin, Saint Petersburg (RU); Ilya Volzhev, Saint Petersburg (RU); Sergey Storozhevykh, Saint Petersburg (RU); Vadim Agarkov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 119 days.

(21) Appl. No.: 14/315,414

(22) Filed: Jun. 26, 2014

(51) Int. Cl.
*G06F 3/06* (2006.01)
*G06F 11/20* (2006.01)

(52) U.S. Cl.
CPC ............ *G06F 3/065* (2013.01); *G06F 3/0619* (2013.01); *G06F 3/0689* (2013.01); *G06F 11/2064* (2013.01); *G06F 11/2082* (2013.01); *G06F 11/2094* (2013.01)

(58) Field of Classification Search
CPC ............ G06F 11/2069; G06F 11/2082; G06F 11/1451; G06F 11/1466; G06F 11/2064; G06F 11/2074
See application file for complete search history.

(56) References Cited

U.S. PATENT DOCUMENTS

| | | | | |
|---|---|---|---|---|
| 5,742,792 A | * | 4/1998 | Yanai | G06F 3/0601 710/1 |
| 5,991,804 A | * | 11/1999 | Bolosky | G06F 11/1096 707/999.01 |
| 8,134,798 B1 | | 3/2012 | Thelin et al. | |
| 8,996,827 B1 | * | 3/2015 | Natanzon | 711/162 |
| 9,317,213 B1 | * | 4/2016 | Gupta | G06F 3/064 |
| 2005/0071586 A1 | * | 3/2005 | Bartfai | G06F 12/0835 711/162 |
| 2009/0063427 A1 | * | 3/2009 | Zuta | G06Q 10/00 |
| 2009/0089343 A1 | * | 4/2009 | Moore | G06F 3/0608 |
| 2012/0209805 A1 | * | 8/2012 | Clifton | G06F 3/0605 707/610 |

OTHER PUBLICATIONS

Notice of Allowance dated Jan. 30, 2015 corresponding to U.S. Appl. No. 14/492,185; 9 Pages.
Vazhenin et al., "Disk Synchronizing;" U.S. Appl. No. 14/492,185, filed Sep. 22, 2014; 16 Pages.

* cited by examiner

*Primary Examiner* — Reginald G Bragdon
*Assistant Examiner* — Thanh D Vo
(74) *Attorney, Agent, or Firm* — Daly, Crowley, Mofford & Durkee, LLP (57) ABSTRACT

In one aspect, a method, includes designating a range of memory in a source disk to synchronize with a target disk, receiving blocks of data that have changed in the source disk and were cloned to a target disk, marking the blocks of data as synchronized and copying data in portions of the range that are not marked as synchronized in the source disk to the target disk.

19 Claims, 9 Drawing Sheets

DISK SYNCHRONIZING

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage typically include an array of a plurality of disks with on-board intelligence and communications electronics and software for making the data on the disks available.

Disks migration enables non-disruptive or minimally disruptive data migration between data storage systems. The major part of the time in migration is consumed by synchronization of the source and target disks. For any solution which provides the functionality for migrating data it is important to minimize the time needed to synchronize the disks which are being migrated.

SUMMARY

In one aspect, a method, includes designating a range of memory in a source disk to synchronize with a target disk, receiving blocks of data that have changed in the source disk and were cloned to a target disk, marking the blocks of data as synchronized and copying data in portions of the range that are not marked as synchronized in the source disk to the target disk.

In another aspect, an apparatus includes electronic hardware circuitry configured to designate a range of memory in a source disk to synchronize with a target disk, receive blocks of data that have changed in the source disk and were cloned to a target disk, mark the blocks of data as synchronized and copy data in portions of the range that are not marked as synchronized in the source disk to the target disk.

In a further aspect, an article includes a non-transitory computer-readable medium that stores computer-executable instructions. The instructions cause a machine to designate a range of memory in a source disk to synchronize with a target disk, receive blocks of data that have changed in the source disk and were cloned to a target disk, mark the blocks of data as synchronized and copy data in portions of the range that are not marked as synchronized in the source disk to the target disk.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

Figure 1:
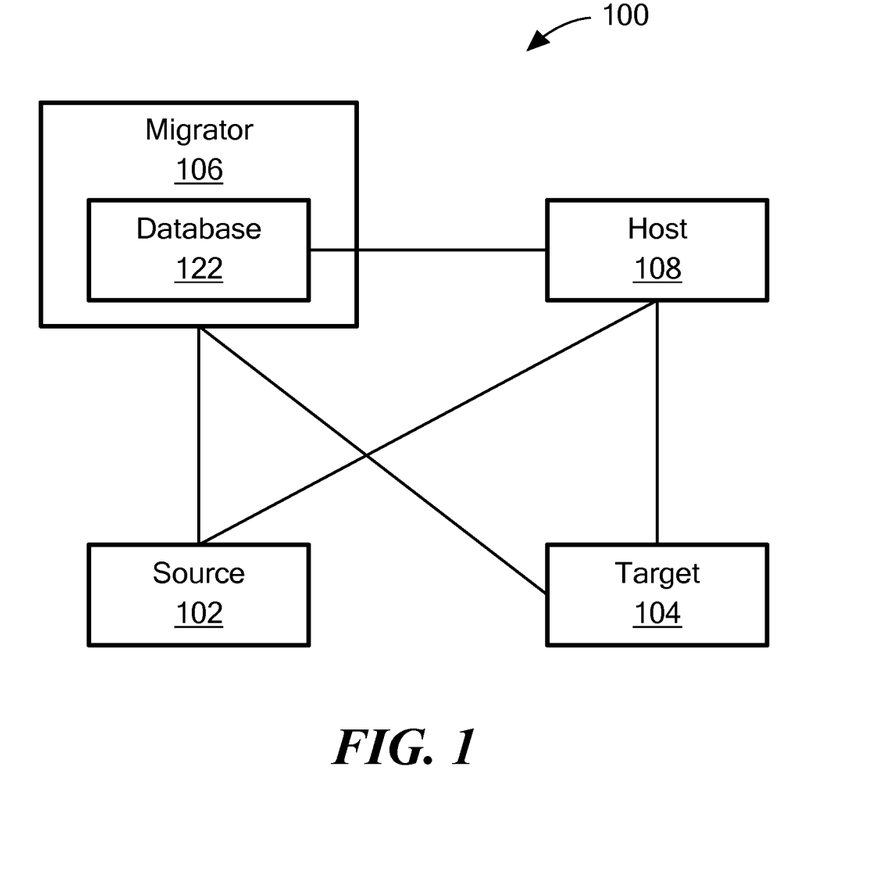
FIG. 1 is a simplified block diagram of an example of a disk migration system.

Referring to FIG. 1, a disk migration system 100 includes a source disk 102, a target disk 104, a migrator 106 and a host 108. The migrator 106 includes a database 122. The migrator 106 migrates data from the source disk 102 to a target disk 104. In order for the migration to take place the source disk 102 and the target disk 104 is synchronized. However, during the synchronization the host 108 may be writing to blocks (write I/Os) on the source disk 102. As will be further described herein the host 108 and the migrator 106 are configured to reduce the synchronization time. Though the host 108 and the migrator 106 are shown as two separate components, in some examples, the migrator 106 may run on the host 108.

The migrator 106 is configured to designating a range of the disk (i.e., portion of the memory) in which changed blocks (i.e., blocks that have changed because the blocks have been written to by the host 108) are reported by the host 108. The host 108 clones any block changes to the source disk 102 to the target device 104 and reports the block changes to the migrator 106. The reported blocks changes are stored in the database 122. The migrator 106 periodically checks for the reported blocks and marks the reported blocks as synchronized in the database 122. In one example, several adjoining blocks may be merged into a single region before storing them in the database 122. Blocks that are not marked as synchronized are synchronized by the migrator 106 using known synchronization methods (e.g., copy sweep (block-by-block copy)). Using the system 100, there is no issue if some changed blocks are not reported or if the migrator 106 does not collect all the reported change blocks. The migrator 106 will synchronize all non-reported blocks using the main synchronization algorithm (e.g., copy sweep).

Figure 2:
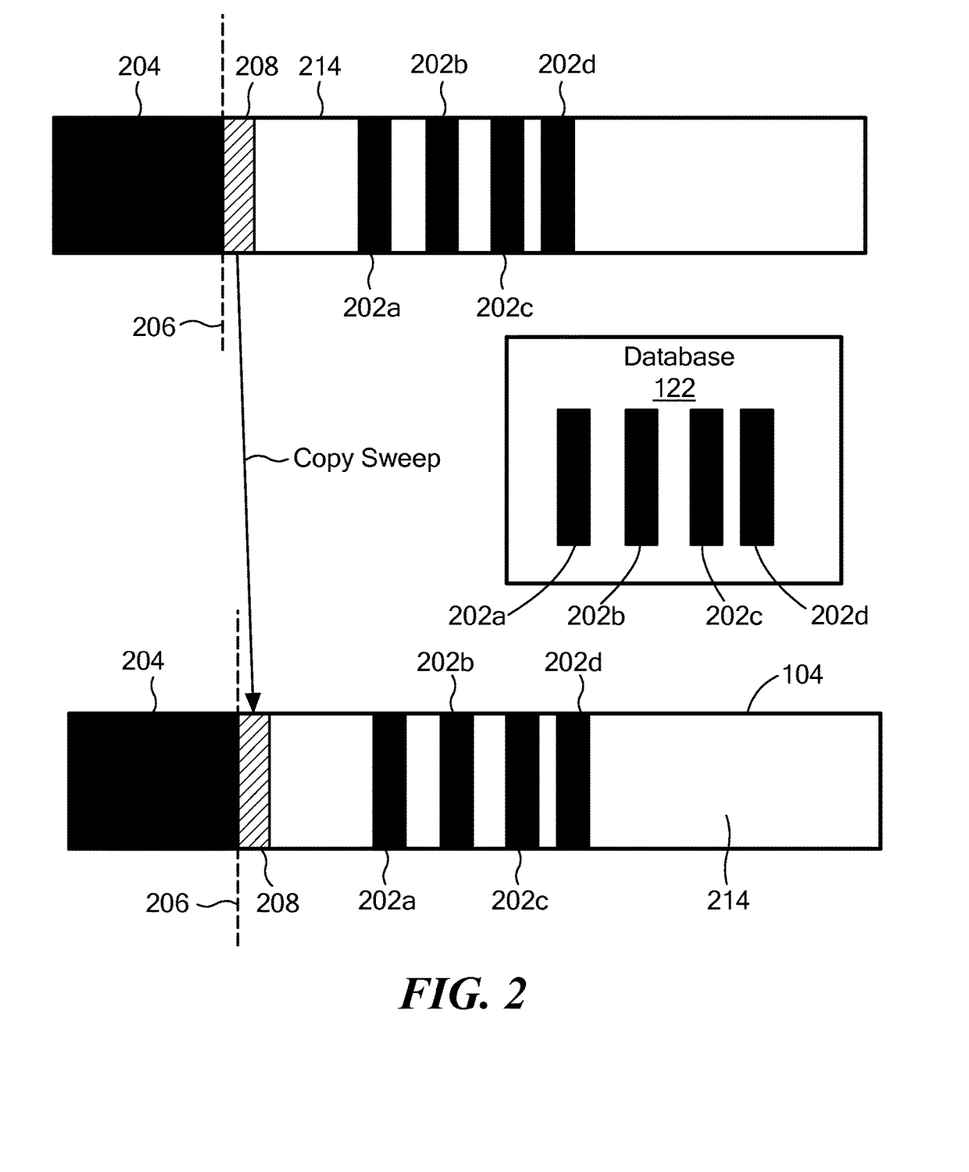
FIG. 2 is a simplified block diagram of a source disk and a target disk during migration using the disk migration system in FIG. 1.

FIG. 2 depicts an example of the synchronization of the source disk 102 and the target disk 104. The respective portions 204 of the disks 102, 104 denote that these portions of the disks 102, 104 have already been synchronized. The dashed lines 206 in each disk 102, 104 denote the beginning of the next range to evaluate. The portions 202a-202d in the disks 102, 104 are those blocks that have been reported by the host 108 and are marked by the migrator 106 as being synchronized. The unfilled portions 214 in the disks 102, 104 are unsynchronized portions. The migrator 106 starts at the dotted line 206 to start synchronization. Since the block 208 was not designated as synchronized the block 208 is copied from the source device 102 to the target device 104.

Figure 3:
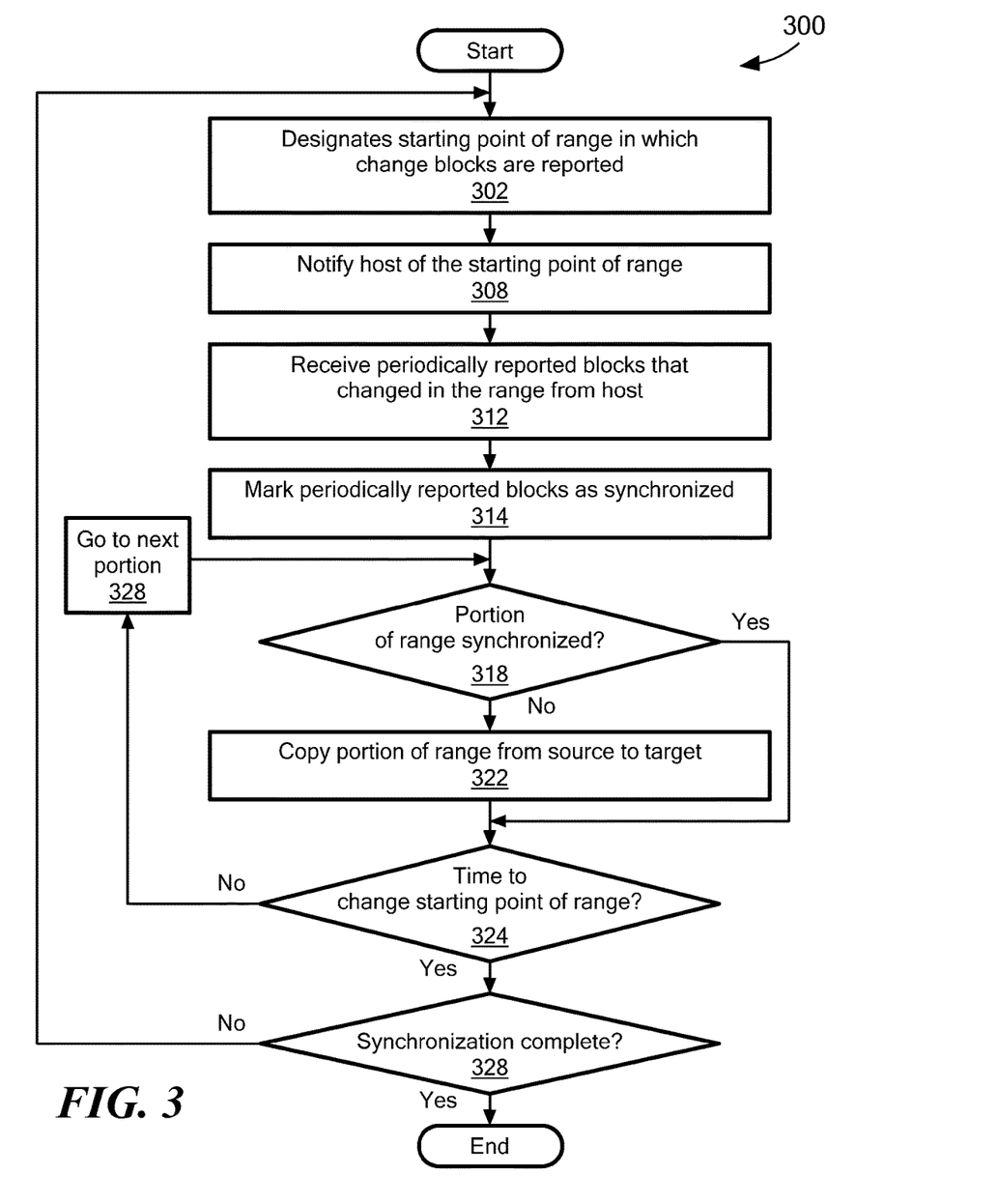
FIG. 3 is a simplified flow chart of an example of a portion of process to synchronize a source disk to a target disk performed by a migrator in FIG. 1.

Referring to FIGS. 2 and 3, an example of a portion of a process to synchronize a source disk to a target disk performed by the migrator 106 is a process 300. Process 300 designates a starting point of a range in which change blocks are reported (302). For example, the migrator 106 starts the range at the edge 206 of already synchronized region 204.

Process 300 notifies the host of the starting point of the range (308) and receives periodically reported blocks that changed in the range from the host (312). The migrator 106 is configured to receive reported blocks periodically throughout the process 300.

Process 300 marks periodically the reported blocks as synchronized (314). The migrator 106 is configured to mark the reported blocks as synchronized periodically throughout the process 300.

Process 300 determines if a portion of the range has been synchronized (318). For example, a portion of the range may be a block of data. In another example, a range may be several blocks of data.

If the portion of the range is not synchronized, process 300 copies the portion of the range from the source disk 102 to the target disk 104 using, for example, copy sweep. If the portion of the range is synchronized, process 300 determines if it is time to change the starting range (324) and if it is not, process 300 goes to the next portion of the range (328). In some example, processing block 322 may be performed while processing blocks 312 and 314 are being performed.

If it is time to change the starting range, process 300 determines if synchronization is complete (328) and if synchronization is not complete, process 300 returns to processing block 302 to designate a new starting point to the range. If synchronization is complete, process 300 ends.

Figure 4:
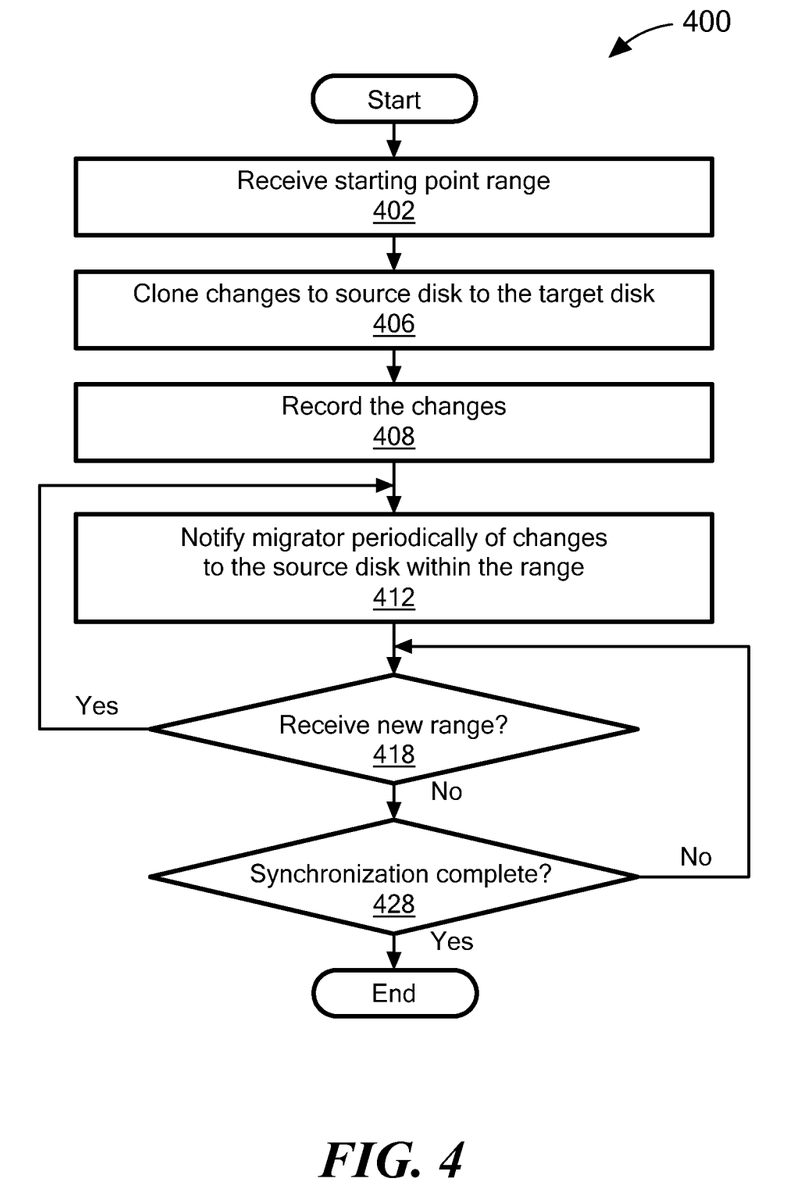
FIG. 4 is a simplified flow chart of an example of a portion of a process to synchronize a source disk to a target disk performed by a host in FIG. 1.

Referring to FIG. 4, an example of a portion of a process to synchronize a source disk to a target disk performed by the host 108 is a process 400. Process 400 receives a starting point of the range from the migrator 106 (402). For example, the host receives a starting point 206.

Process 400 clones changes to the source disk 102 to the target disk 104 (406). For example, the host 108 clones changes to the source disk 102 to the target disk 104.

Process 400 records changes to the source disk (408). For example, the host 108 saves the changes in memory (not shown) on the host 108.

Process 400 notifies the migrator 108 periodically of any changes to the source disk within the range (412). Process 400 determines if a new range is received (418) and if a new range is received notifies the migrator of any changes within the new range using the processing block 412. If no new range is received from the migrator 106, process 400 determines if synchronization is complete (428) and if synchronization is complete, process 400 ends.

Figure 5:
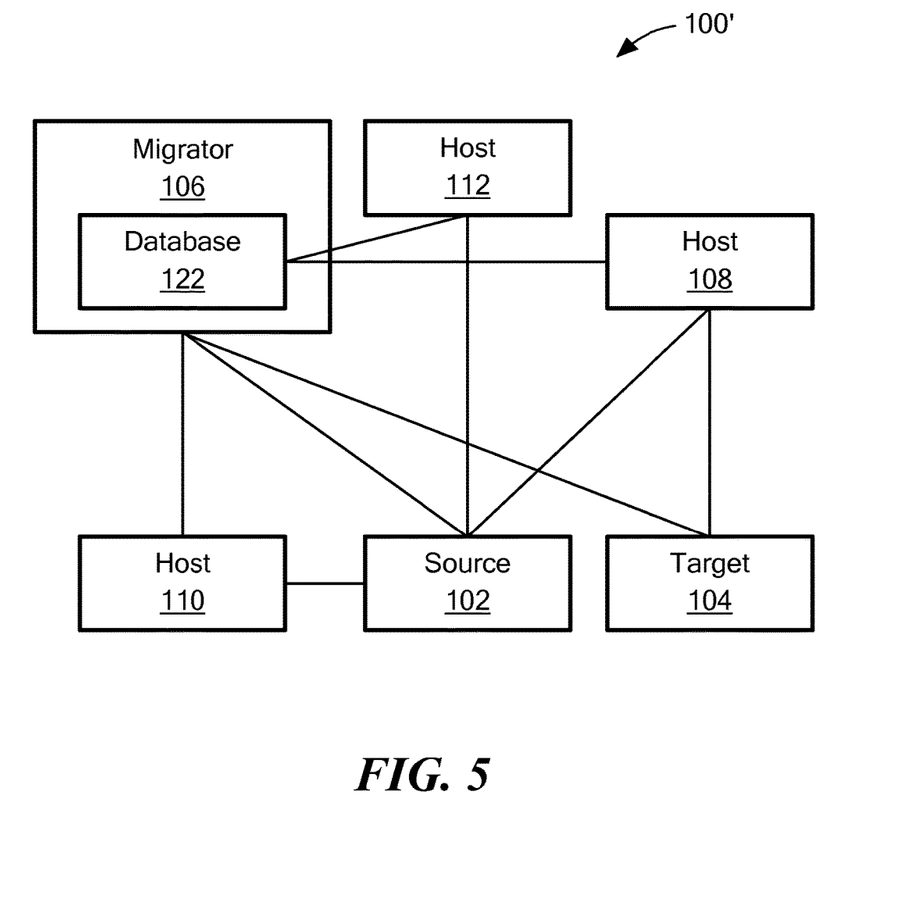
FIG. 5 is a simplified block diagram of another example of a disk migration system.

Referring to FIG. 5, a disk migration system 100' includes a source disk 102, a target disk 104, a migrator 106 and hosts 108, 110, 112. In this configuration, the system 100' is an active-active cluster environment (e.g., multiple nodes provide access to the source disk). The migrator 106 is configured to set a minimal size of changed block to be reported by a host (e.g., host 108, host 110, host 112), which will minimize fragmentation of changed blocks in the database 122. For example, a host (e.g., host 108, host 110, host 112) reports changed blocks only for I/O larger than 128 k. This will minimize fragmentation of changed blocks in a database. The migrator 106 is further configured to populate the disk range for the changed blocks that are reported.

The hosts 108, 110, 112 are configured to limit the number of changed block reported for a specified period of time. For example, disks synchronization process is configured so that the hosts 108, 110, 112 populate 100 changed block ranges every minute. If during the one-minute period, a host cloned more than 100 block ranges, the rest of the block ranges are not reported (i.e., only the first 100 block ranges are reported).

In one example, time periods for the hosts 108, 110, 112 to populate changed blocks and for the migrator to collect changed blocks is set equal, which ensure that most of the reported data is collected by the migrator 108.

Figure 6:
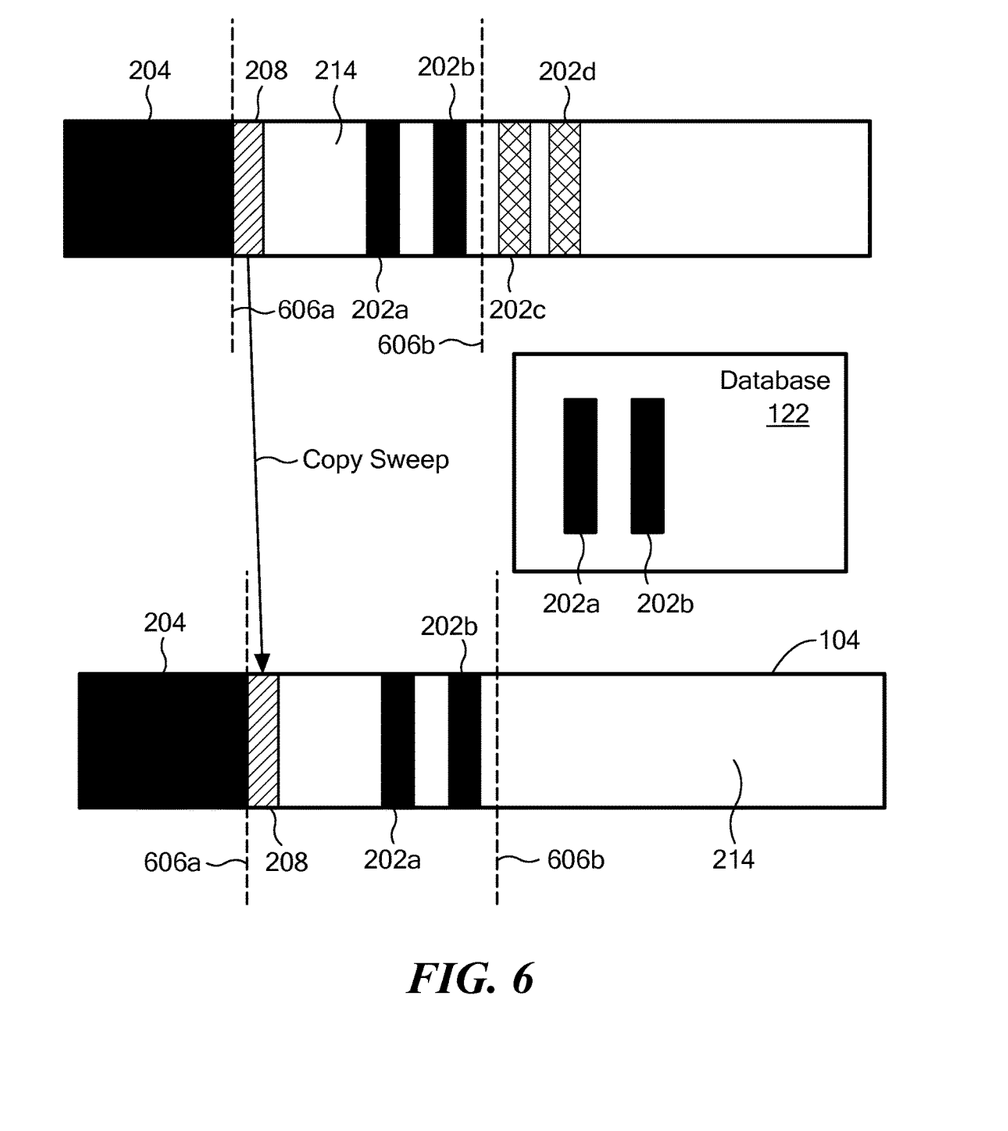
FIG. 6 is a simplified block diagram of a source disk and a target disk during synchronization using the disk migration system in FIG. 5.

FIG. 6 depicts an example of the synchronization of the source disk 102 and the target disk 104 for the system 100'. The dashed lines 606a in each disk 102, 104 denote the beginning of the next range to evaluate and the dash lines 606b in each disk 102, 104 marks the end of the range. The portions 202a, 202b in the disks 102, 104 are those blocks that have been reported by the host 108 and are marked by the migrator 106 as being synchronized. The portions 202c, 202d in the source disk 102 are those blocks that are not reported by the host 108 because they are outside the range and are not marked by the migrator 106 as being synchronized.

Figure 7:
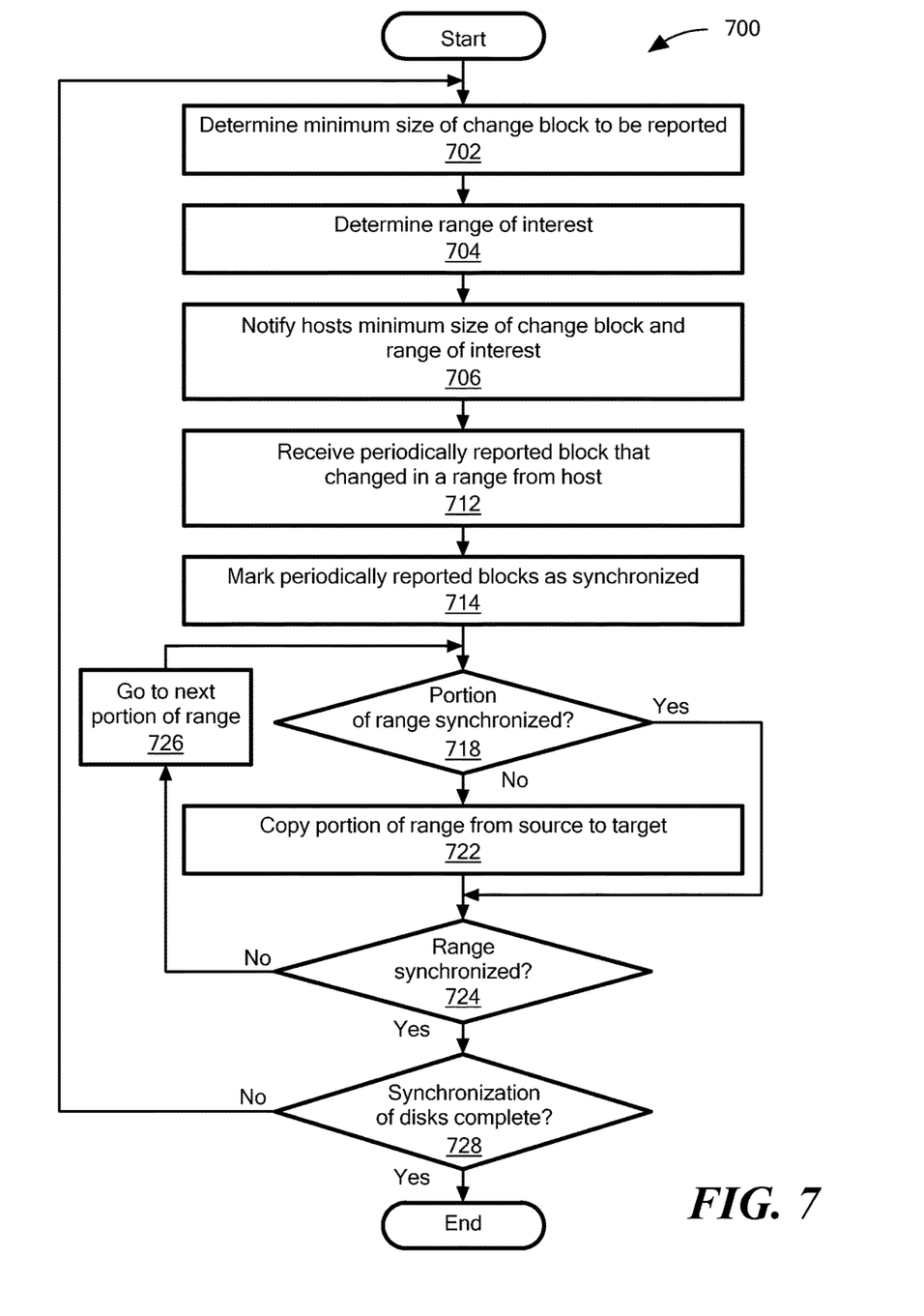
FIG. 7 is a simplified flow chart of an example of a portion of process to synchronize a source disk to a target disk performed by a migrator in FIG. 5.

Referring to FIGS. 6 and 7, an example of a portion of process to synchronize a source disk to a target disk performed by a migrator 106 is a process 700. Process 700 determines a minimum size of change blocks to be reported by the hosts (702). Process 700 determines a range of interest (704). For example, the range is determined for to host will report changed blocks in that range. In one particular example, a starting point 606a and the end point 606b is determined. In another example, the migrator 106 gives the starting point and a memory size. In one example, the range is on the order of gigabytes.

Process 700 notifies the host of the range (706). For example, the migrator 106 notifies the hosts 108, 110, 112 of the range.

Process 700 receives periodically reported blocks that changed in the range and at least a minimum size from the host (712). The migrator 106 is configured to receive reported blocks periodically throughout the process 700.

Process 700 marks periodically the reported blocks as synchronized (714). The migrator 106 to mark the reported blocks as synchronized periodically throughout the process 700.

Process 700 determines if a portion of the range has been synchronized (718). For example, a portion of the range may be a block of data. In another example, a range may be several blocks of data.

If the portion of the range is not synchronized, process 700 copies the portion of the range from the source disk 102 to the target disk 104 using, for example, copy sweep. If the portion of the range is synchronized, process 700 determines if synchronization of the range is complete (724) and if the synchronization of the range is not, process 700 goes to the next portion of the range (726). In some example, processing block 722 may be performed while processing blocks 712 and 714 are being performed.

If the synchronization of the range is complete, process 700 determines if synchronization of the disks 102, 104 is complete (728) and if synchronization of the disks is not complete, process 700 returns to processing block 702. If synchronization of the disk is complete, process 700 ends.

Figure 8:
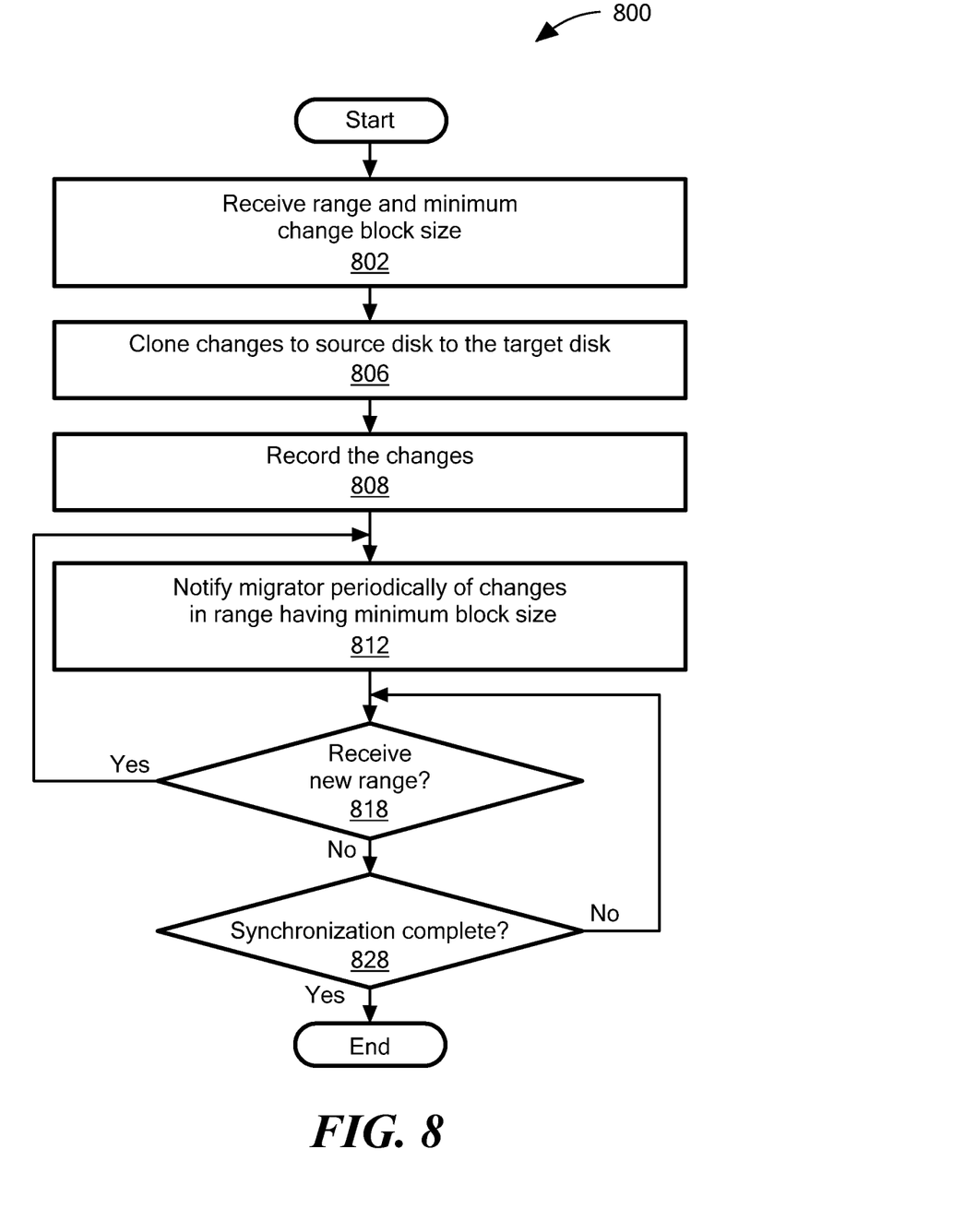
FIG. 8 is a simplified flow chart of an example of a portion of a process to synchronize a source disk to a target disk performed by hosts in FIG. 5.

Referring to FIG. 8, an example of a portion of a process to synchronize a source disk to a target disk performed by the hosts 108, 110, 112 in the system 100' is a process 800. Process 800 receives a starting point of the range from the migrator 106 (802). For example, the host receives a starting point 606a and ending point 606b. For example, the host receives a starting point 606a and a memory size.

Process 800 clones changes to the source disk 102 to the target disk 104 (806). For example, the hosts 108, 110, 112 clone changes to the source disk 102 to the target disk 104.

Process 800 records changes to the source disk (808). For example, the host 108, 110, 112 saves the changes in memory (not shown) on the host 108, 110, 112.

Process 800 notifies the migrator 108 of any changes to the source disk within the range and at least a minimum size (812). In one example, each host is limited to the number of report changes it may send to the migrator.

Process 800 determines if a new range is received (818) and if a new range is received notifies the migrator of any changes within the new range using the processing block 812. If no new range is received from the migrator 106, process 800 determines if synchronization is complete (828) and if synchronization is complete, process 400 ends.

Figure 9:
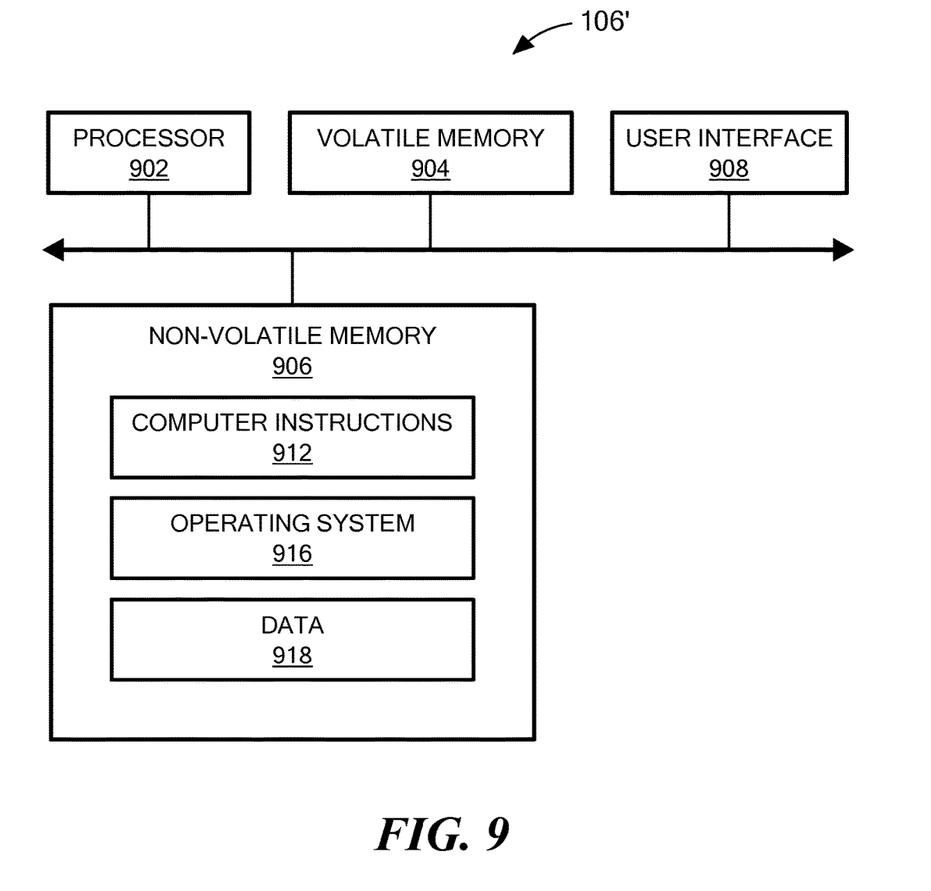
FIG. 9 is a simplified block diagram of an example of a computer on which any of the processes of FIGS. 3, 4, 7 and 8 may be implemented.

Referring to FIG. 9, a computer 900 includes a processor 902, a volatile memory 904, a non-volatile memory 906 (e.g., hard disk) and the user interface (UI) 908 (e.g., a graphical user interface, a mouse, a keyboard, a display, touch screen and so forth). The non-volatile memory 906 stores computer instructions 912, an operating system 916 and data 918 including physical storage requirements 926 (i.e., data used to determine physical storage requirements for a class of service, tenant and project). In one example, the computer instructions 912 are executed by the processor 902 out of volatile memory 904 to perform all or part of the processes described herein (e.g., processes 300, 400, 700 and 800).

The processes described herein (e.g., processes 300, 400, 700 and 800) are not limited to use with the hardware and software of FIG. 9; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/ machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300, 400, 700 and 800 are not limited to the specific processing order of FIGS. 3, 4, 7 and 8, respectively. Rather, any of the processing blocks of FIGS. 3, 4, 7 and 8 may be re-ordered, combined or removed, performed in parallel or in serial, as necessary, to achieve the results set forth above.

The processing blocks (for example, in the processes 300, 400, 700 and 800) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method, comprising:
designating, at a migrator, a range of memory in a source disk to synchronize with a target disk, wherein the range of memory is a subset of memory in the source disk;
receiving, at the migrator, reports of blocks of data that have changed in the range of memory in the source disk and were written by a host to the source disk and cloned by the host to the target disk, wherein receiving reports of the blocks of data from the host comprises receiving reports of no more than a predetermined amount of blocks of data from the host for a predetermined period of time;
marking, in a database at the migrator, the blocks of data as synchronized; and
copying to the target disk, at the migrator, data in portions of the range that are not marked as synchronized in the source disk, wherein at least some of blocks of data were written by the host to the source disk concurrent with the copying at the migrator.

2. The method of claim 1, further comprising designating a minimum size of the blocks of data to receive.

3. The method of claim 1, wherein receiving reports of blocks of data that have changed in the source disk and were cloned to a target disk comprises receiving reports of blocks of data periodically,
 wherein copying the data comprises copying the data while receiving reports of blocks of data periodically.

4. The method of claim 1, wherein marking the blocks of data comprises marking the blocks of data periodically,
 wherein copying the data comprises copying the data while marking the blocks of data periodically.

5. The method of claim 1 wherein the range of memory is less than all memory in the source disk, the method further comprising repeating the steps of designating a range of memory in the source disk, receiving blocks of data that have changed, marking the blocks of data as synchronized, and copying data in portions of the range that are not marked as synchronized until all the memory in the source disk is synchronized with the target disk.

6. The method of claim 1 further comprising synchronizing all non-reported blocks using a copy sweep technique.

7. An apparatus, comprising:
 electronic hardware circuitry configured to:
  designate, at a migrator, a range of memory in a source disk to synchronize with a target disk, wherein the range of memory is a subset of memory in the source disk;
  receive, at a migrator, reports of blocks of data that have changed in the range of memory in the source disk and were written by a host to the source disk and cloned by the host to the target disk, wherein receiving reports of the blocks of data from the host comprises receiving reports of no more than a predetermined amount of blocks of data from the host for a predetermined period of time;
  mark, in a database at a migrator, the blocks of data as synchronized; and
  copy to the target disk, at a migrator, data in portions of the range that are not marked as synchronized in the source disk, wherein at least some of blocks of data were written by the host to the source disk concurrent with the copying at the migrator.

8. The apparatus of claim 7, wherein the circuitry comprises at least one of a processor, a memory, a programmable logic device or a logic gate.

9. The apparatus of claim 7, further comprising circuitry configured to designate a minimum size of the blocks of data to receive.

10. The apparatus of claim 7, wherein the circuitry configured to receive reports of blocks of data that have changed in the source disk and were cloned to a target disk comprises circuitry configured to receive reports of blocks of data periodically,
 wherein the circuitry configured to copy the data comprises circuitry configured to copy the data while receiving reports of blocks of data periodically.

11. The apparatus of claim 7, wherein the circuitry configured to mark the blocks of data comprises circuitry configured to mark the blocks of data periodically,
 wherein the circuitry configured to copy the data comprises circuitry configured to copy the data while marking the blocks of data periodically.

12. The apparatus of claim 7, wherein the range of memory is less than all memory in the source disk, wherein the electronic hardware circuitry is configured to repeatedly designate a range of memory in the source disk, receive blocks of data that have changed, mark the blocks of data as synchronized, and copy data in portions of the range that are not marked as synchronized until all the memory in the source disk is synchronized with the target disk.

13. The apparatus of claim 7 wherein the electronic hardware circuitry is further configured to synchronize all non-reported blocks using a copy sweep technique.

14. An article comprising:
 a non-transitory computer-readable medium that stores computer-executable instructions, the instructions causing a machine to:
  designate, at a migrator, a range of memory in a source disk to synchronize with a target disk, wherein the range of memory is a subset of memory in the source disk;
  receive, at a migrator, reports of blocks of data that have changed in the range of memory and were written by the host to the source disk and cloned by the host to the target disk, wherein receiving reports of the blocks of data from the host comprises receiving reports of no more than a predetermined amount of blocks of data from the host for a predetermined period of time;
  mark, in a database at a migrator, the blocks of data as synchronized; and
  copy to the target disk, at a migrator, data in portions of the range that are not marked as synchronized in the source disk, wherein at least some of blocks of data were written by the host to the source disk concurrent with the copying at the migrator.

15. The article of claim 14, further comprising instructions causing the machine to designate a minimum size of the blocks of data to receive.

16. The article of claim 14, wherein the instructions causing the machine to receive reports of blocks of data that have changed in the source disk and were cloned to a target disk comprises instructions causing the machine to receive reports of blocks of data periodically,
 wherein the instructions causing the machine to copy the data comprises instructions causing the machine to copy the data while receiving reports of blocks of data periodically.

17. The article of claim 14, wherein the instructions causing the machine to mark the blocks of data comprises instructions causing the machine to mark the blocks of data periodically,
 wherein the instructions causing the machine to copy the data comprises instructions causing the machine to copy the data while marking the blocks of data periodically.

18. The article of claim 14, wherein the range of memory is less than all memory in the source disk, wherein the instructions causing the machine to repeatedly designate a range of memory in the source disk, receive blocks of data that have changed, mark the blocks of data as synchronized, and copy data in portions of the range that are not marked as synchronized until all the memory in the source disk is synchronized with the target disk.

19. The article of claim 14 further comprising instructions causing the machine to synchronize all non-reported blocks using a copy sweep technique.

* * * * *